United States Patent Office 2,891,555
Patented June 23, 1959

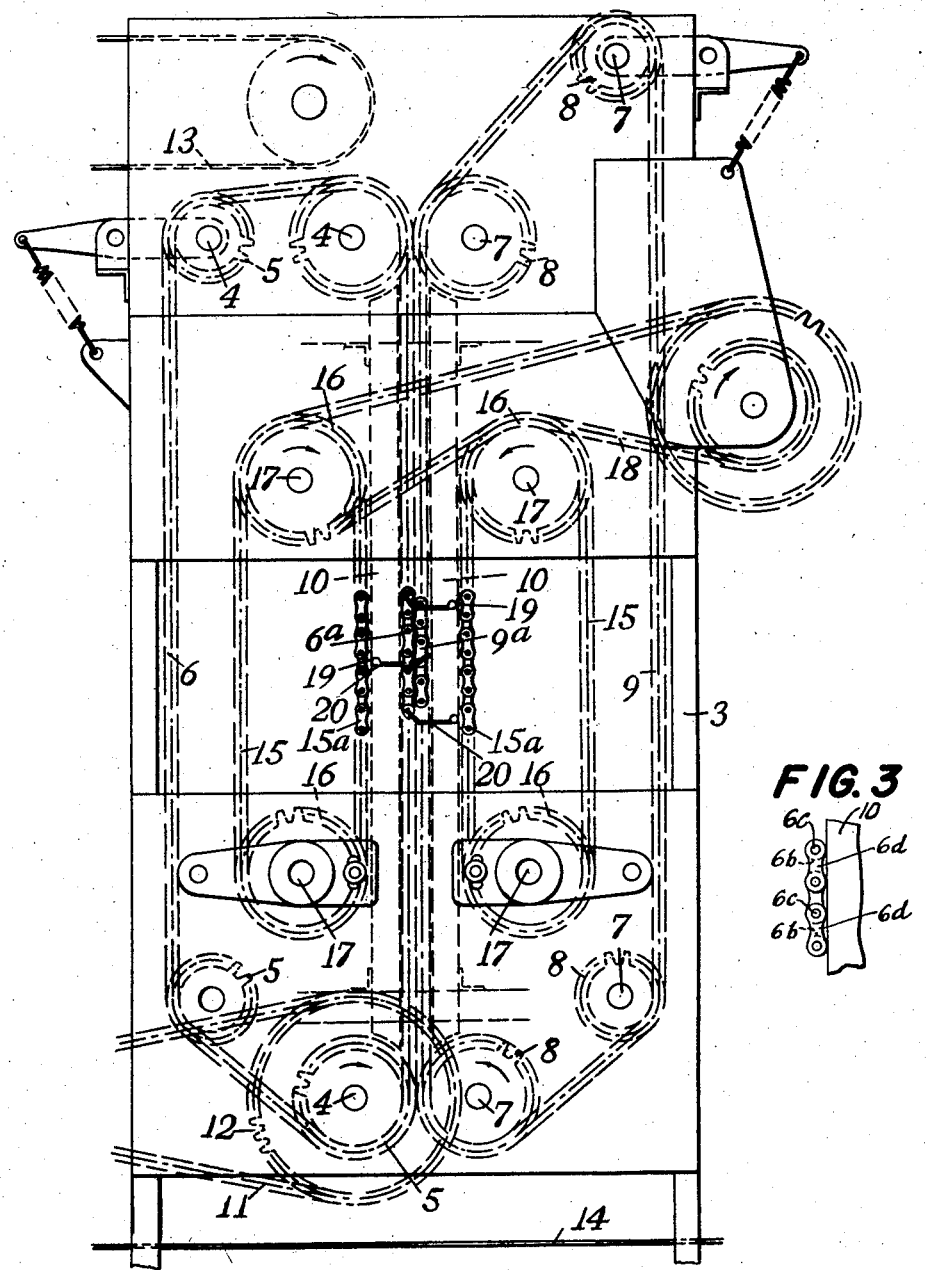

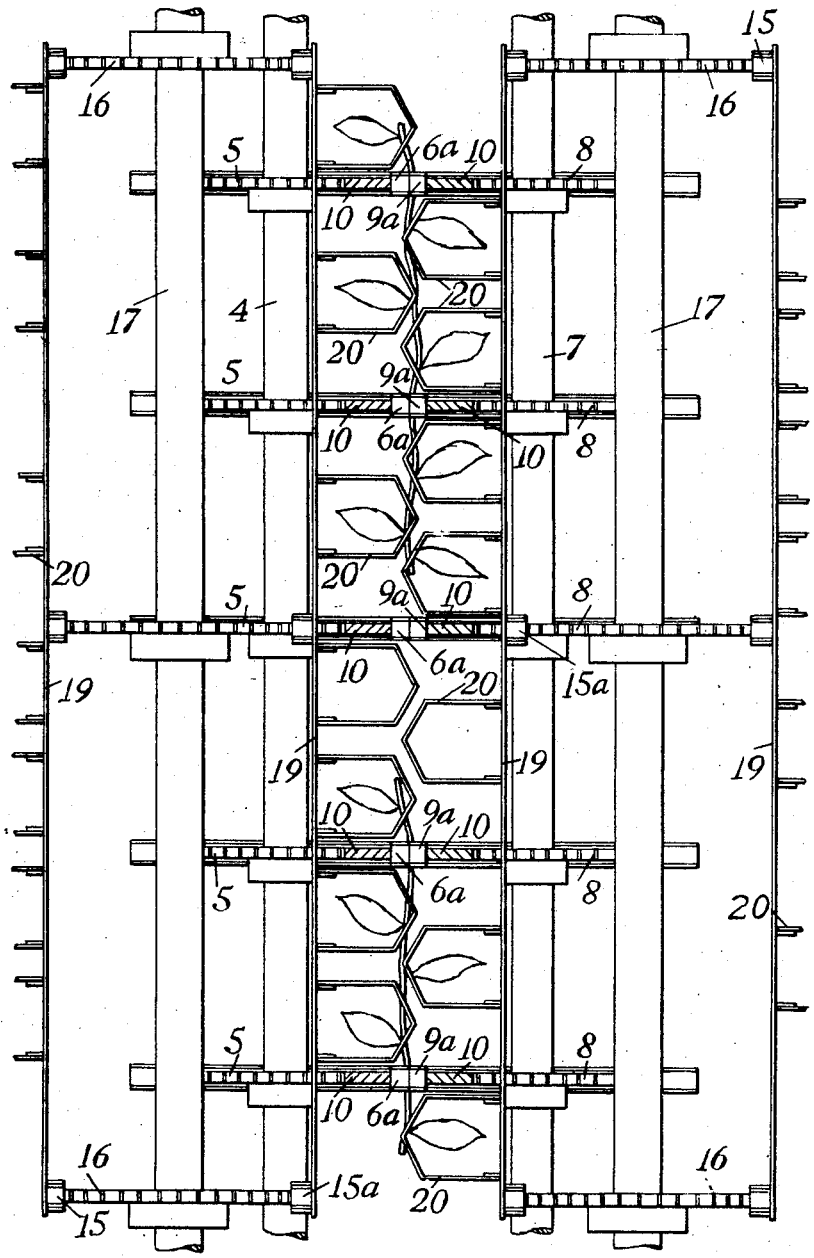

2,891,555

MACHINE FOR PLUCKING HOPS OR LIKE PLANTS

Albert E. Brookes, Bush Bank, Suckley, England

Application October 11, 1956, Serial No. 615,257

Claims priority, application Great Britain October 18, 1955

1 Claim. (Cl. 130—30)

This invention relates to a machine intended primarily for plucking hop flowers from their bines, but also usable for analogous purposes such, for example, as the plucking of beans form their bines or the separation of seeds from herbs and the like, and has for its object to provide such a machine in a convenient and efficient form, and particularly to provide an improved means for gripping and traversing the bines relative to plucking means.

In a machine according to the invention a plurality of pairs of endless driving chains are arranged parallel with one another, each pair of chains having parallel runs between which the bine is adapted to be held transversely for movement relative to plucking means.

In the accompanying drawings Figure 1 is a side elevation, and Figure 2 is a sectional plan to an enlarged scale of one example of the invention, and Figure 3 is a fragmentary view illustrating the driving chain construction.

Referring to the drawings in a frame 3 are mounted a plurality of parallel horizontal shafts 4 each of which carries a plurality of axially spaced sprocket wheels 5. A plurality of parallel endless driving chains 6 are supported on the sprocket wheels 5 so that each chain engages one sprocket wheel on each of the shafts 4. Also in the frame 3 are mounted a plurality of parallel horizontal shafts 7 each of which carries a plurality of axially spaced sprocket wheels 8 similar in number to the sprocket wheels 5 on each of the shafts 4. Supported on the sprocket wheels 8 are endless driving chains 9 each of which engages one sprocket wheel on each shaft 7.

Each chain 6 has one run 6ᵃ which extends parallel and in close proximity to a run 9ᵃ of a chain 9 with which it constitutes a pair, and the arrangement is such that when nothing is between these runs the links of the pair of chains interlock as shown by virtue of their shapes. These runs 6ᵃ and 9ᵃ may be arranged to extend in any direction, but conveniently extend vertically (as shown), and are held in engagement with one another by guides 10.

At least one of the shafts 4 or 7 is positively driven from any convenient source, as by a chain 11 engaging an additional sprocket wheel 12 on one of the shafts, the drive imparted to the chains 6 and 9 being such that the interengaging runs 6ᵃ and 9ᵃ of the pairs move in a downward direction at the same speed.

The bines to be plucked are fed by any convenient means such as a conveyor 13 between the upper ends of the interengaging runs of the pair of chains 6 and 9, so that the bines extend transversely of the said runs, and are gripped at spaced intervals between a plurality of pairs of interengaging runs. Also at the lower ends of the interengaging runs 6ᵃ and 9ᵃ is a conveyor 14 for removing the plucked bines, and the material plucked therefrom. At each side of the interengaging runs 6ᵃ and 9ᵃ of the chains 6 and 9 there is provided a further plurality of endless driving chains 15 arranged parallel with one another. The chains 15 are supported respectively on spaced sprocket wheels 16 on shafts 17 which are mounted in the frame 3 parallel with the shafts 4 and 7, a pair of shafts 17 at opposite sides of the runs 6ᵃ and 9ᵃ being positively driven in opposite directions as by a chain 18. The plurality of chains 15 at each side of the interengaging runs of the conveying chains are interconnected by transversely extending bars or strips 19 connected to the chains at equi-spaced intervals. These bars or strips 19 each carry a plurality of outwardly directed plucking fingers 20 which in the example shown take the form of resilient wire loops. Further the chains 15 at each side of the runs 6ᵃ and 9ᵃ are arranged so that one run 15ᵃ of each chain 15 extends parallel to the interengaging runs 6ᵃ and 9ᵃ in a position in which the fingers 20 can engage the flowers of bines gripped between the latter runs. The runs 15ᵃ are also arranged to move vertically downwards but at a greater speed than the runs 6ᵃ and 9ᵃ of the chains 6 and 9. Thus as the bines are conveyed downwardly they are overtaken by fingers 20 at each side which pluck the flowers or seeds from them.

Throughout the specification, by the expression driving chain is meant a chain such as that indicated by 6 which is adapted for engagement with a sprocket wheel as 5, and which (as shown in Figure 3) has a roller 6ᵇ surrounding each pivot pin 6ᶜ connecting a pair of adjacent links, this roller being adapted to roll upon a guide 10 in the case of the chains 6 and 9. Preferably the driving chains are of the normal type having links shaped as shown with waisted side members 6ᵈ arranged so that the waisted parts of the side members of the links of the run 6ᵃ engage with end parts of the side members of the links of the run 9ᵃ when nothing is disposed between these runs. By this arrangement the bines are gripped firmly between the said runs whilst being traversed relative to the plucking means.

Having thus described my invention what I claim as new and desire to secure by Letters Patent is:

A machine for plucking hops and like plants, comprising in combination a plurality of pairs of endless chains, sprocket wheels by which the chains are supported with portions of each pair of chains situated in parallel relationship, and with the outer sides of the said portions of the chains facing and in close proximity to each other for gripping between them transversely disposed stems of the plants to be plucked, guides between which the said portions of the chains extend, and which serve to retain the said portions in close proximity to each other, driving mechanism operatively connected to at least one of the sprocket wheels for driving the chains so that the said portions thereof move in the same direction and at the same speed for imparting movement to the plant stems gripped between them, plucking means mounted at the inner sides of the said portions of the chains to move through paths parallel with and adjacent the said portions, the plucking means having the form of additional endless chains provided with laterally projecting fingers for acting on the plants while the latter are gripped between and moved by the said portions of the first mentioned chains, and driving mechanism operatively connected to the additional endless chains for moving them through the said paths in the same direction as, but at a greater speed than, the said portions of the first mentioned chain.

References Cited in the file of this patent

UNITED STATES PATENTS

| | | |
|---|---|---|
| 506,904 | Chisholm | Oct. 17, 1893 |
| 788,270 | Luce | Apr. 25, 1905 |
| 1,392,258 | Mayer | Sept. 27, 1921 |
| 1,426,498 | Owen | Aug. 22, 1922 |
| 2,187,526 | Thys | Jan. 16, 1940 |